US007423552B2

(12) United States Patent
Sherman et al.

(10) Patent No.: US 7,423,552 B2
(45) Date of Patent: Sep. 9, 2008

(54) "WARNING BUMP" TRAFFIC SAFETY DEVICE

(76) Inventors: Tim Sherman, 92 Castle Point Blvd., Piscataway, NJ (US) 08854; Robert Kenneth Fulagar, 122 Spencer Rd., Basking Ridge, NJ (US) 07920; Scott Allen Pfeiffer, 65 Pine tree Dr., Parlin, NJ (US) 08859

( * ) Notice: Subject to any disclaimer, the term of this patent is extended or adjusted under 35 U.S.C. 154(b) by 134 days.

(21) Appl. No.: 10/860,457

(22) Filed: Jun. 3, 2004

(65) Prior Publication Data

US 2005/0270179 A1 Dec. 8, 2005

(51) Int. Cl.

| | |
|---|---|
| ***G08G 1/01*** | (2006.01) |
| ***E01C 23/16*** | (2006.01) |
| ***E01F 9/00*** | (2006.01) |
| *B60Q 7/00* | (2006.01) |

(52) U.S. Cl. .................... 340/933; 340/908; 340/908.1; 116/63 P; 404/15; 404/16

(58) Field of Classification Search ................. 340/933, 340/908, 908.1; 404/15, 16
See application file for complete search history.

(56) References Cited

U.S. PATENT DOCUMENTS

| | | | | |
|---|---|---|---|---|
| 3,720,181 | A | 3/1973 | Elkins | 116/63 P |
| 3,732,842 | A * | 5/1973 | Vara, Sr. | 116/63 P |
| 4,490,069 | A | 12/1984 | Cushman | 404/15 |
| 5,106,226 | A | 4/1992 | Fanslow | 404/15 |
| 5,661,474 | A * | 8/1997 | Douglas | 340/940 |
| 5,775,834 | A | 7/1998 | Jackson | 404/15 |
| 6,623,206 | B1 * | 9/2003 | Blair et al. | 404/16 |
| 2002/0001505 | A1 | 1/2002 | Bond | 404/15 |

OTHER PUBLICATIONS

Roadway Shoulder Rumble Strips U.S. Dept Transportation FHWA Technical Advisory T 5040.35 Dec. 20, 2001 Work Zone devices, U.S. Dept of Transportation FHWA Crash Tested Work Zone Traffic Control Devices, U.S. Dept of Transportation, FHWA Memorandum, Aug. 28, 1998 Traffic Control Zone name of publication not known see pp. 11-42 attached.

* cited by examiner

*Primary Examiner*—Donnie L Crosland
(74) *Attorney, Agent, or Firm*—Horst M. Kasper

(57) ABSTRACT

A Warning Bump traffic safety device comprised of a base which is inserted over traffic cones or barrels and a strip and extensions, generally trapezoidal in cross section, attached to the base which extends into the roadway which causes both an audible and sensory warning to motorists driving over these strips. This traffic safety device is typically deployed in construction work zones in the buffer and work areas to provide additional warnings to both drivers as they approach a construction work area and additional warnings to both drivers and construction workers if a driver encroaches into lateral buffer area in the work zone. These traffic safety devices also tend to stabilize the cones and barrels.

21 Claims, 8 Drawing Sheets

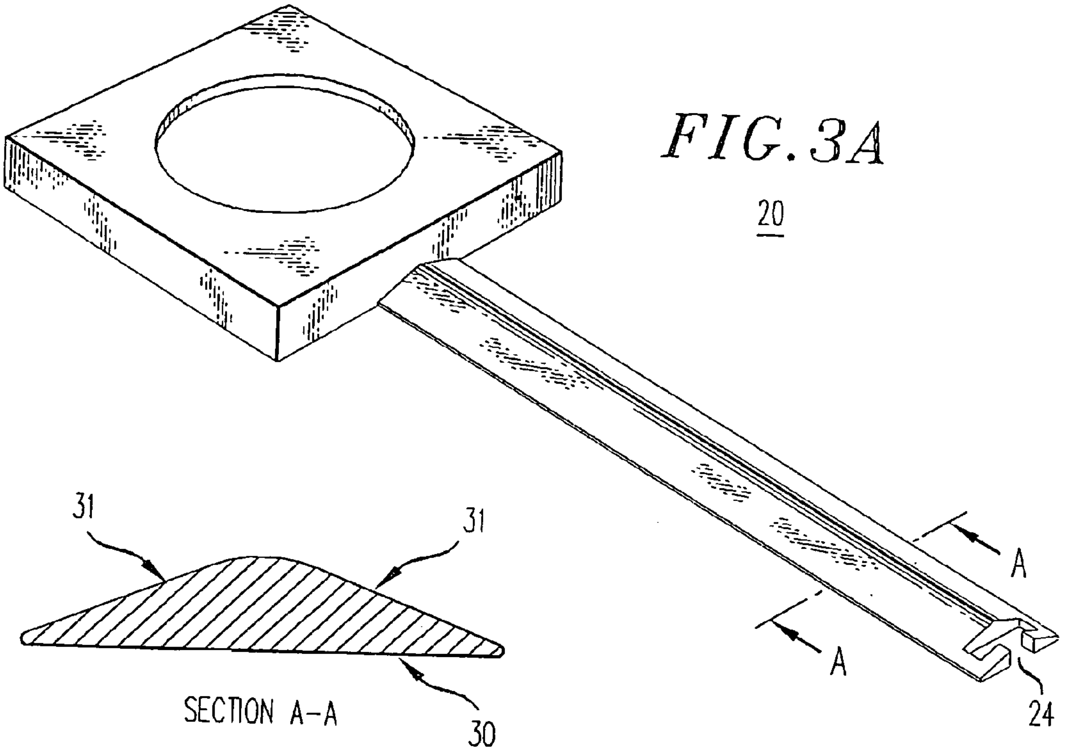
FIG. 3A
FIG. 3C
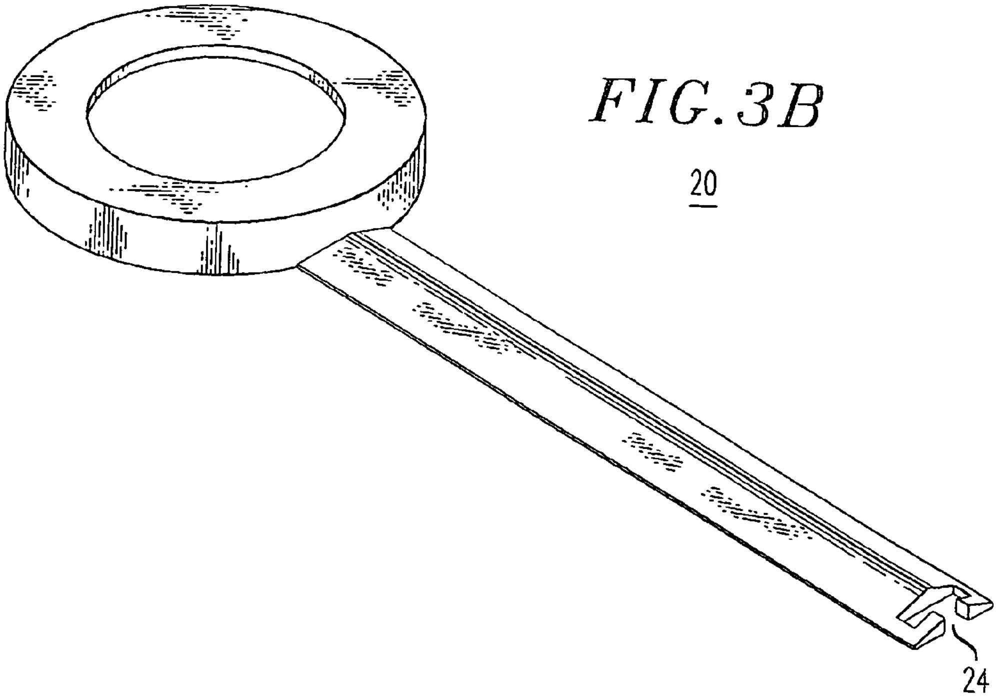
FIG. 3B

FIG. 4A
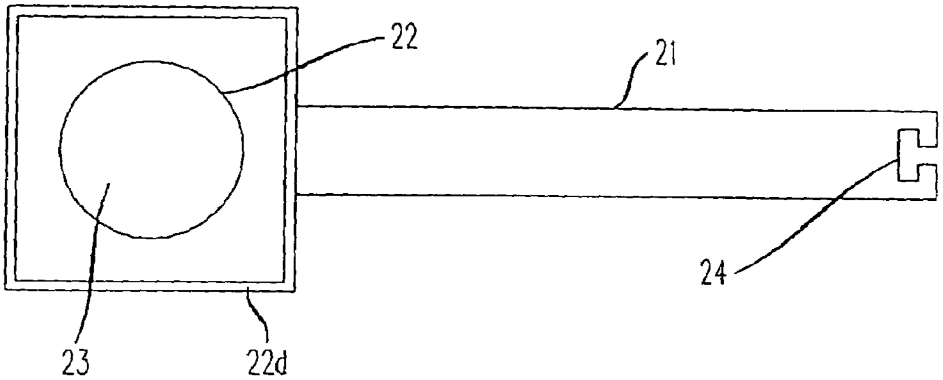
FIG. 4B
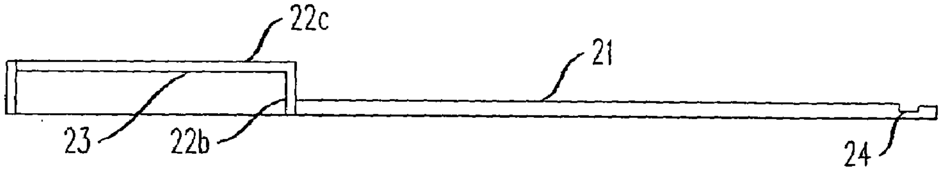
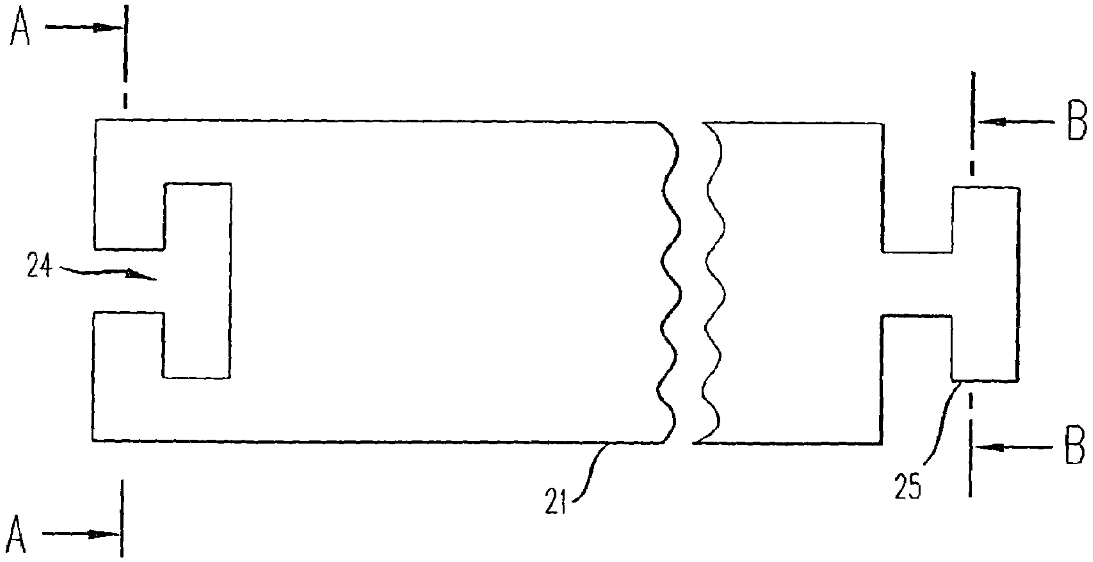
FIG. 5

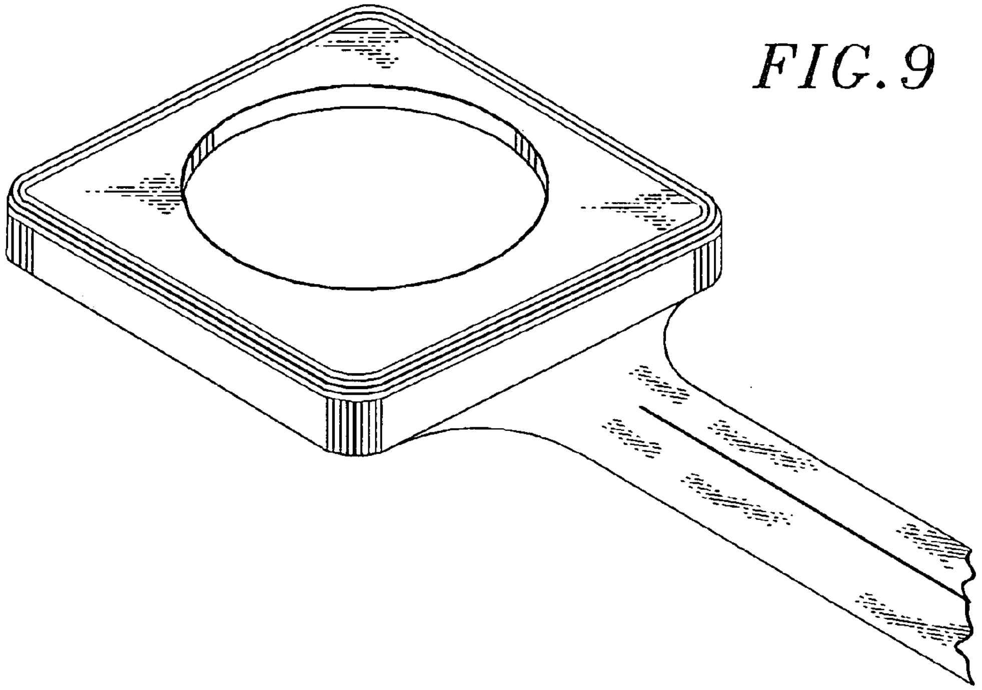
FIG. 9
FIG. 10A
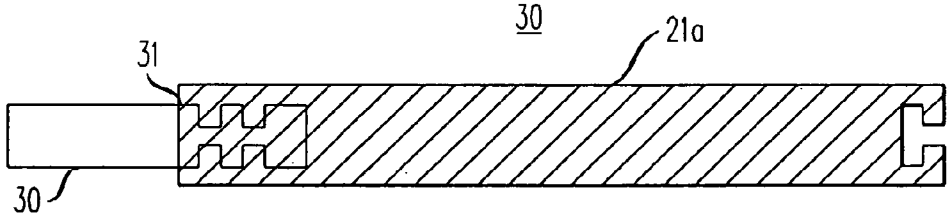
FIG. 10B
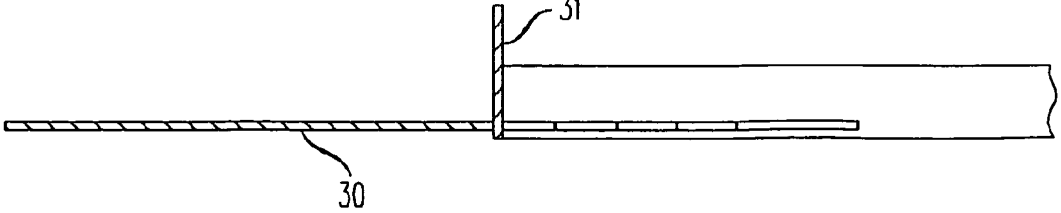

"WARNING BUMP" TRAFFIC SAFETY DEVICE

I. BACKGROUND OF THE INVENTION

The field of the invention relates generally to warning devices used to alert motorists entering construction work zones prior to the motorists entering the portion of the roadway on which work is being conducted and devices to warn workers in work zones of encroaching traffic. There are extensive regulations and publications of various government entities describing, in great detail, methods and procedures for setting up safety devices to control traffic in roadway construction projects which are categorized as Traffic Control Zones. These Traffic Control Zones contain several discrete areas with different functions which include: 1) an advance warning area which puts motorists on notice as to what to expect ahead followed by a transition area in which the traffic flow is diverted from its normal path as the vehicles approach the actual work area, 2) a buffer area in which no work is performed and no vehicles or material are stored which provides two-dimensional buffering, that is distance in the direction of traffic flow from the end of the transition area to the beginning of the work area and a lateral buffering between the lane or lanes in which the traffic is flowing through the work area and the work area itself, 3) this is followed by the work area where the actual work takes place and equipment and material are stored and 4) the termination area in which the traffic is redirected into the normal traffic path along the roadway.

Roadway work areas are highly hazardous to both workers and motorists. Getting the attention of motorists as they approach the work zone as well as warning the workers of impending vehicle traffic are important steps in minimizing the risk of accidents and injuries arising from the unavoidable disruption of the traffic flow in work areas. In addition, varying approaches are necessary when taking into consideration the duration of the work to be performed on or adjacent to a roadway. The duration of work is typically characterized as follows: 1) long term stationary work which will require more than three days for the work, 2) intermediate term stationary work that requires more than one daylight period and up to three days to complete the work, or nighttime work lasting more than one hour, 3) short term stationary daytime work that occupies a location for one to twelve hours, 4) short duration work that occupies a location for up to one hour and 5) mobile work that moves intermittently or continuously along the roadway. It is important for a traffic safety device to be usable in as many of these types of work situations as possible.

II. DESCRIPTION OF PRIOR ART

In providing for the safest work area, both for motorists and workers, numerous devices have been used in the transition, buffer, and work area to get the attention of approaching motorists and divert them from the normal path of travel prior to the work area, generally slow them down as they traverse the work area, and then allow an orderly resumption of traffic flow past the work area. Frequently used devices include cones, barrels, flashing lights, directional arrows, concrete barriers such as the Jersey Barriers (compound shaped trapezoidal concrete barriers) commonly used for temporary and permanent lane dividers, flagmen and other types of devices intended to catch the attention of motorists to heighten their awareness and warn them of the existence of a construction zone. Extensive listings of acceptable work zone traffic control devices are available from the Federal Highway Administration and the references to cones, barrels, concrete barriers and other such traffic safety devices include those in said listings.

Many of these various devices and methods of getting the attention of motorists, while effective in some aspects, are deficient in two important ways. First, they do not provide notice or warning to the workers that a vehicle is approaching or entering the work area or the lateral buffer area and second, they typically engage only the visual sense of the motorists without providing any audible or physical sensation to the approaching motorist. Some of the more effective means of getting a motorist's attention, which are not typically used in road construction, are "rumble strips" and grooved pavement, which transmit both an audible warning to the motorists as well as significant vibration transmitted through the vehicle to the operator. In addition, these types of devices could provide others in the vicinity with an audible warning that a vehicle is approaching. The usefulness of this type of auditory and sensory warning is well-known, for instance, the U.S. Department of Transportation Federal Highway Administration, in Technical Advisory T5040.35, describes roadway shoulder rumble strips, the benefits in their use in preventing run-off-road crashes because of their ability to get the attention of distracted, drowsy, or fatigued drivers.

By employing a device such as that comprising the present invention in various configurations in the transition area, buffer area, and work area, in addition to any visual warning devices, the Warning Bump, provides both an audible warning as the wheels of the vehicle pass over the present invention to both the vehicle operators and to the individuals in the work area as well as the physical sensation from the Warning Bump transmitted to and through the vehicle to the driver supplementing both the visual and audible warnings with the physical sensation of passing over The Warning Bump as a vehicle traverses these three areas.

In addition, the use of this "Warning Bump" type of warning device reduces the potential risks in the work area which result from collisions with cones, barrels and signs which become projectiles from contact with oncoming vehicles and are thrown into the work area with sufficient force to cause serious injury or death. The typical cone or barrel normally rests directly on the roadway surface and has a base flange for stability. The "Warning Bump" when used with these type of safety devices rests on or covers these base flanges to further stabilize and immobilize these devices.

It is clear that these types of audible and sensory warning devices are beneficial. There have been various attempts to implement these characteristics in prior art. Fixed "speed bumps" and "rumble strips" such as the portable highway warning apparatus disclosed in U.S. Pat. No. 4,490,069, the warning system for vehicles described in U.S. Pat. No. 5,106,226, the speed sensitive automatic speed bump as described in U.S. patent number 2002/0001505(a)1 published Jan. 3, 2002, the portable highway warning device with frangible retaining rings—U.S. Pat. No. 5,775,834, and an inflatable warning device for roadways—U.S. Pat. No. 3,720,181, all of which disclose a "speed bump" or "rumble strip" type of warning device. However, all have significant disadvantages including complexity, the need to anchor the device to the roadway, intricate structures, or lack of means of maintaining the position of the device on the roadway. Nothing in the prior art lends itself to the kind of easy deployment, is compact in form and has the general utility suitable for use in all of the various classifications of duration of work from mobile work through long term stationary duration projects.

III. SUMMARY OF THE INVENTION

It is the object of the present invention to provide a traffic safety device that is usable in construction and can be readily deployed in work zones or other areas in which it is desirable to provide warnings to motorists and other individuals present in the area.

It is a further object of the present invention to provide a traffic safety device that can be readily used in combination with existing traffic safety devices such as cones, barrels, Jersey barriers, and signs as well as other such devices as may come into use in the future.

It is also an object of the present invention to provide a traffic safety device that provides an audible and vibratory warning to the motorist as well as an audible warning to individuals in the area that the safety device is employed.

It is also an object of the present invention to provide a traffic safety device that is not physically anchored to the roadway.

It is a further object of the present invention to provide a traffic safety device that can be readily deployed in various configurations, both as to the portion of the roadway covered as well as the spacing between devices.

It is also an object of the present invention to provide a traffic safety device that is comprised of fixed-length modules which can be readily assembled or disassembled to provide for various deployment configurations.

It is an additional object of the present invention to provide a traffic control device to be readily attached to other traffic control devices such as cones, barrels, jersey barriers, and the like.

It is a further object of the present invention to provide a traffic safety device that is made out of an economical and durable material including but not limited to rubber or plastic with or without coloring additives.

It is an additional object of the present invention to provide a traffic safety device that is deployed and is readily reusable with a very substantial life span.

It is also an object of the present invention to provide a traffic safety device that does not adversely affect the stability of the other traffic control devices with which it is used in combination.

It is also an object of the present invention to provide a traffic safety device that does not adversely affect the stability of the vehicles passing over the device.

It is also an object of the present invention to provide a traffic safety device that does not shift or displace on the pavement when used in traffic lanes.

It is a further object of the present invention to provide a means that will tend to stabilize and restrain other traffic warning devices such as cones and barrels.

It is an additional object of the present invention to provide a traffic safety device that can be readily deployed and removed for mobile, short duration, short term stationary, intermediate term stationary and long term stationary duration of work time frames.

It is a further object of the present invention to provide a traffic safety device that is suitable for deployment in advance-warning area, transition area, buffer area, and work area traffic control zones.

It is an additional object of the present invention to provide a traffic safety device that incorporates visual warning by incorporating reflective strips and or using distinctive colors in the present invention in addition to the audible and sensory stimulation resulting from the vehicle wheels traversing over the present invention.

It is also an object of the present invention to provide a traffic safety device that supplements the lateral buffer area, both in the buffer area and the work zone, by deploying the present invention in short lengths at close intervals in either the buffer or the work area, or in both, to provide intense audible and sensory warning to the motorists as well as an audible warning to the workers if a vehicle approaches the edge of the work area.

It is also an additional object of the present invention to provide for a traffic safety device that can be anchored to roadway surfaces using conventional means such as spikes or adhesive compounds in instances where anchoring is desirable.

IV. BRIEF DESCRIPTION OF THE DRAWINGS

FIG. 3*a* is an isometric view of the present invention with a base for use within the traffic cones.

FIG. 3*b* is an isometric view of the present invention with a base used in combination with a standard traffic barrel.

FIG. 3*c* is a cross section through A-A in FIG. 3*a*.

FIG. 4*a* is a plan view of the embodiment of the present invention that works in cooperation with standard traffic cones.

FIG. 4*b* is an elevation view of the embodiment of the present invention that works in cooperation with standard traffic cones.

FIG. 5 is a plan view of the extension component of the Warning Bump.

Figure 6:
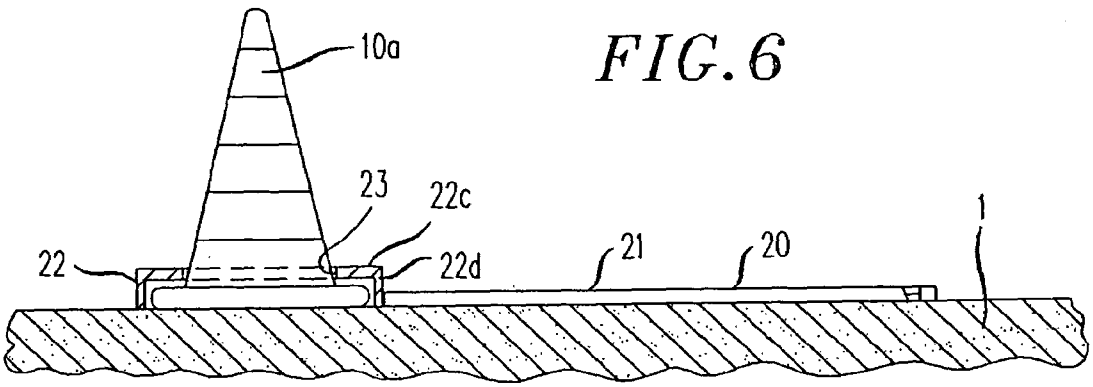

FIG. 6 is a cross-section of the present invention showing the use with a standard traffic cone.

Figure 7A:
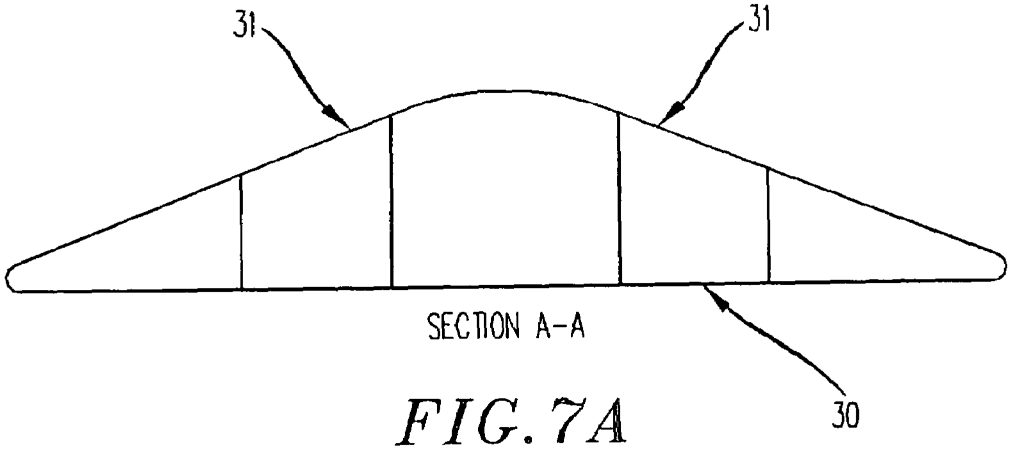
Figure 7B:
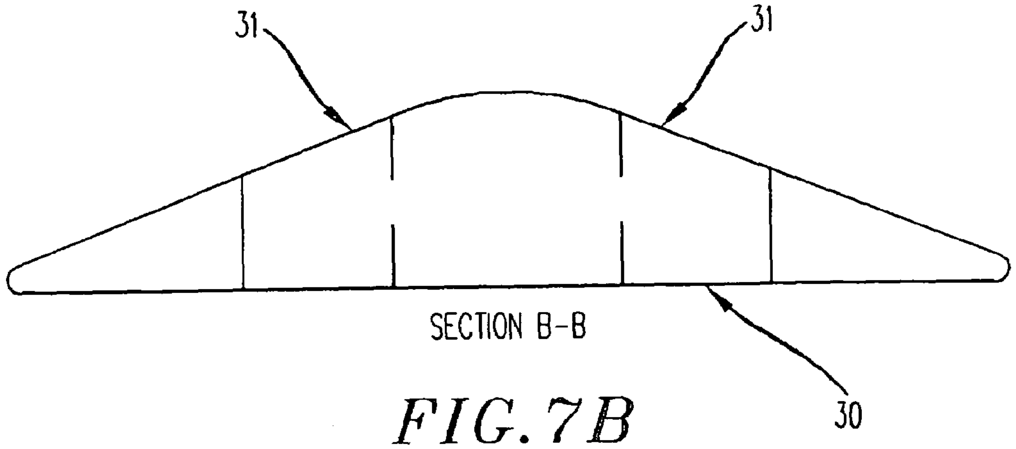

FIGS. 7*a* and 7*b* are cross sections through Section A-A and B-B in FIG. 5 of the extension component of the Warning Bump showing the attachment means at each end in the preferred embodiment.

Figure 8A:
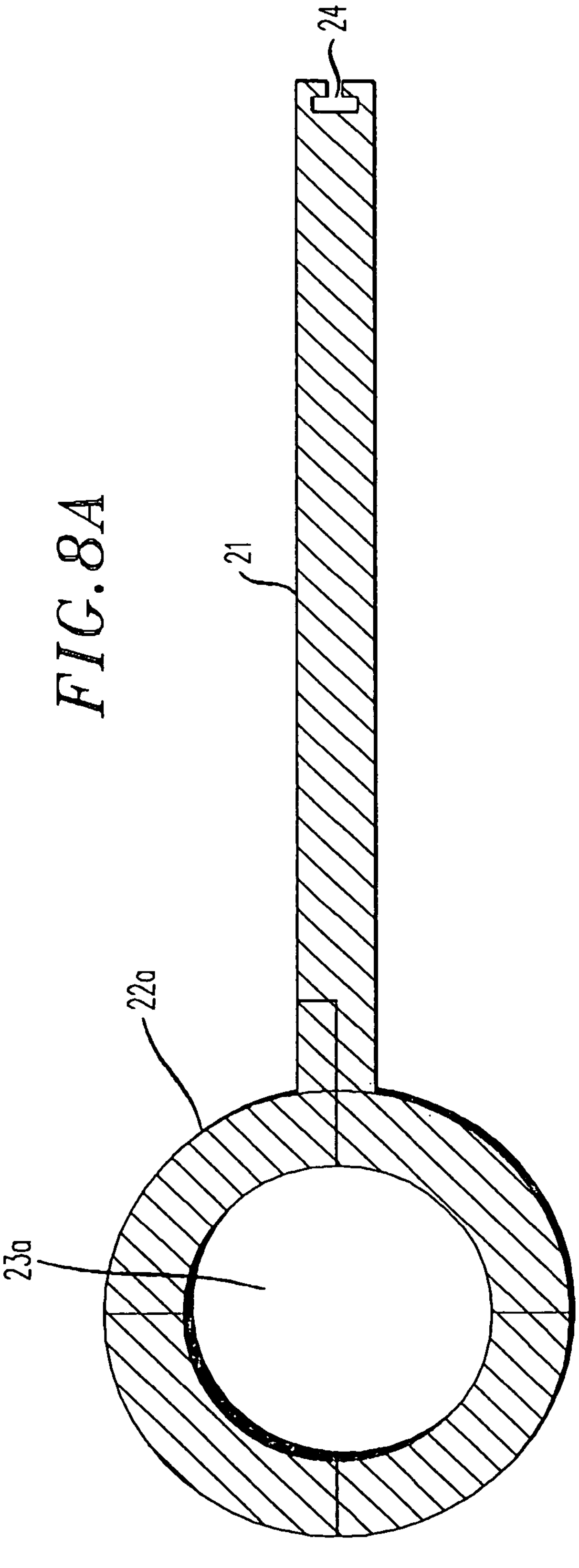

FIG. 8*a* is plan view of an embodiment of the "Warning Bump" that works in cooperation with a standard traffic barrel.

Figure 8B:
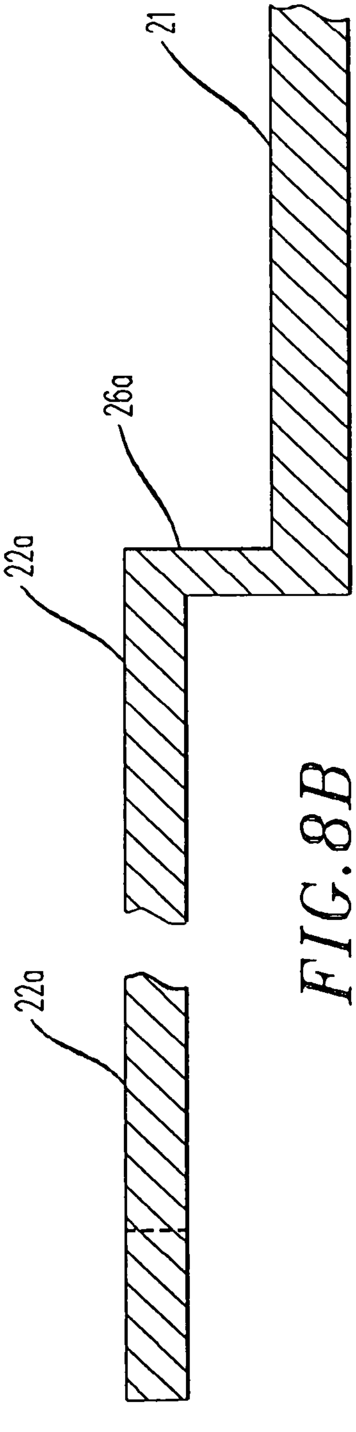

FIG. 8*b* is an elevation view of an embodiment of the "Warning Bump" that works in cooperation with a standard traffic barrel.

FIG. 9 illustrates an alternate embodiment of the Warning Bump use in combination with a standard traffic cone.

FIG. 10*a* shows a plan view of the Warning Bump traffic safety device with a means of attachment to a Jersey concrete barrier.

FIG. 10*b* shows an elevation view of the anchor plate and installation tab.

Figure 11:
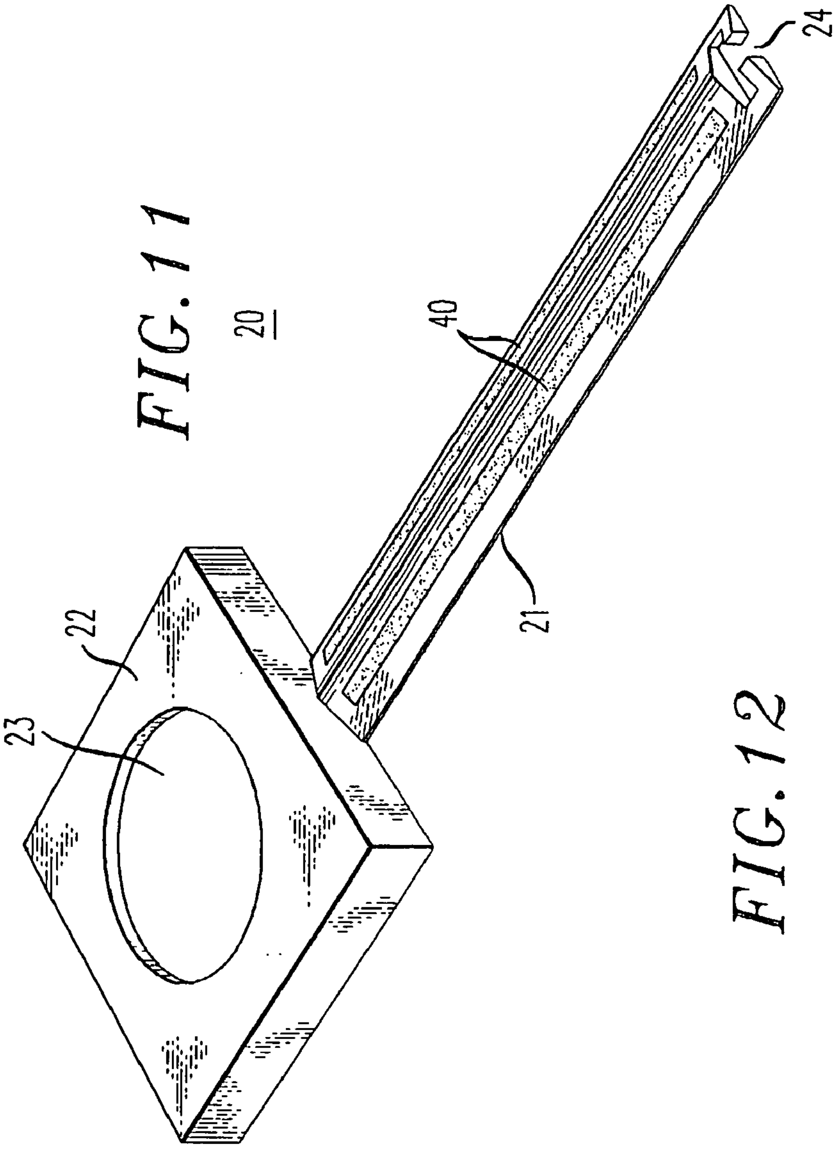

FIG. 11 shows an embodiment of the Warning Bump with reflective surfaces.

Figure 12:
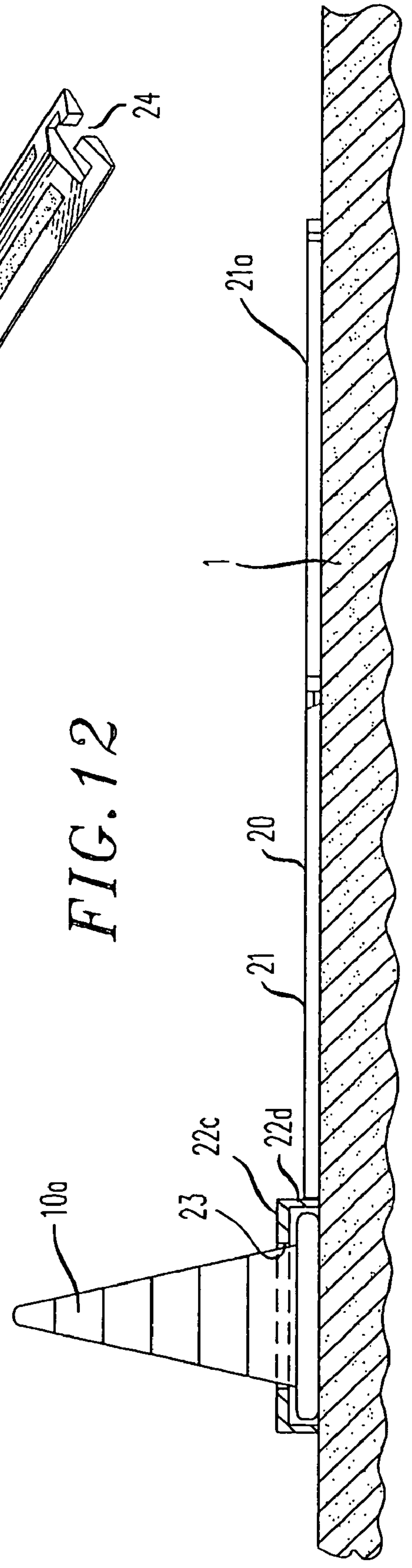

FIG. 12 shows the preferred configuration for interconnection additional segments of the "Warning Bump" to lengthen the device when deployed in the roadway.

V. DETAILED DESCRIPTION OF THE INVENTION

Figure 1:
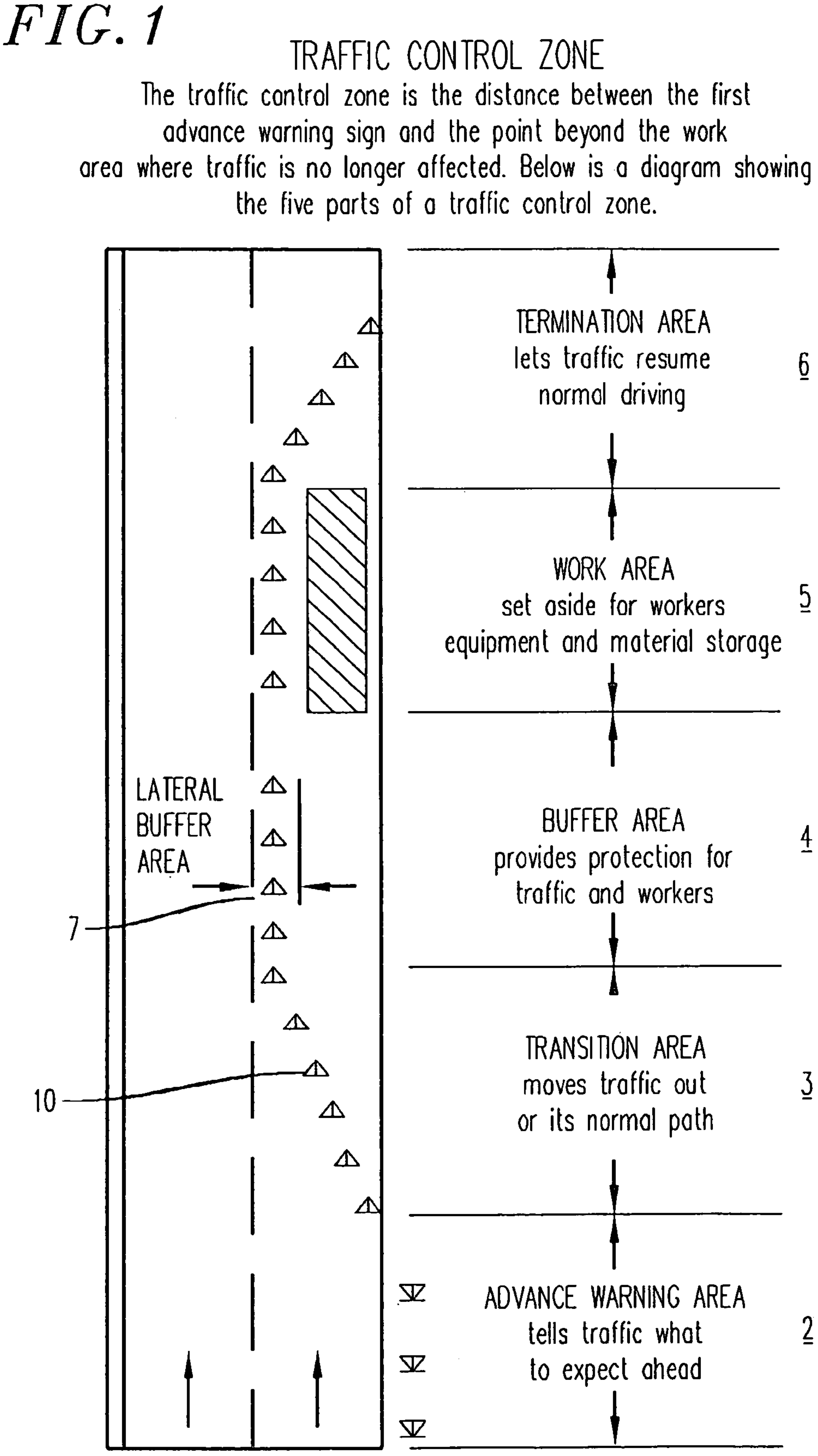
FIG. 1 is an illustration of a traffic control zone.

FIG. 1 describes a typical traffic control zone showing, roadway 1, in which the arrows show the direction of vehicle traffic coming into advanced warning area 2, in which signs and other devices are used to inform drivers of what to expect ahead. Warning area 2 is followed by transition area 3 which contains traffic control devices 10, such as standard barrels or cones, which move the oncoming traffic into a new travel pattern as the traffic approaches buffer area 4, which precedes work area 5, in which actual roadwork occurs. The aforesaid are followed by termination area 6, where the normal traffic pattern is resumed. Traffic control devices 10, located in buffer area 4 are set to create lateral buffer area 7, which provides lateral spacing between work area 5 and the portion of roadway 1 upon which vehicles will traverse the roadway in work area 5.

Figure 2:
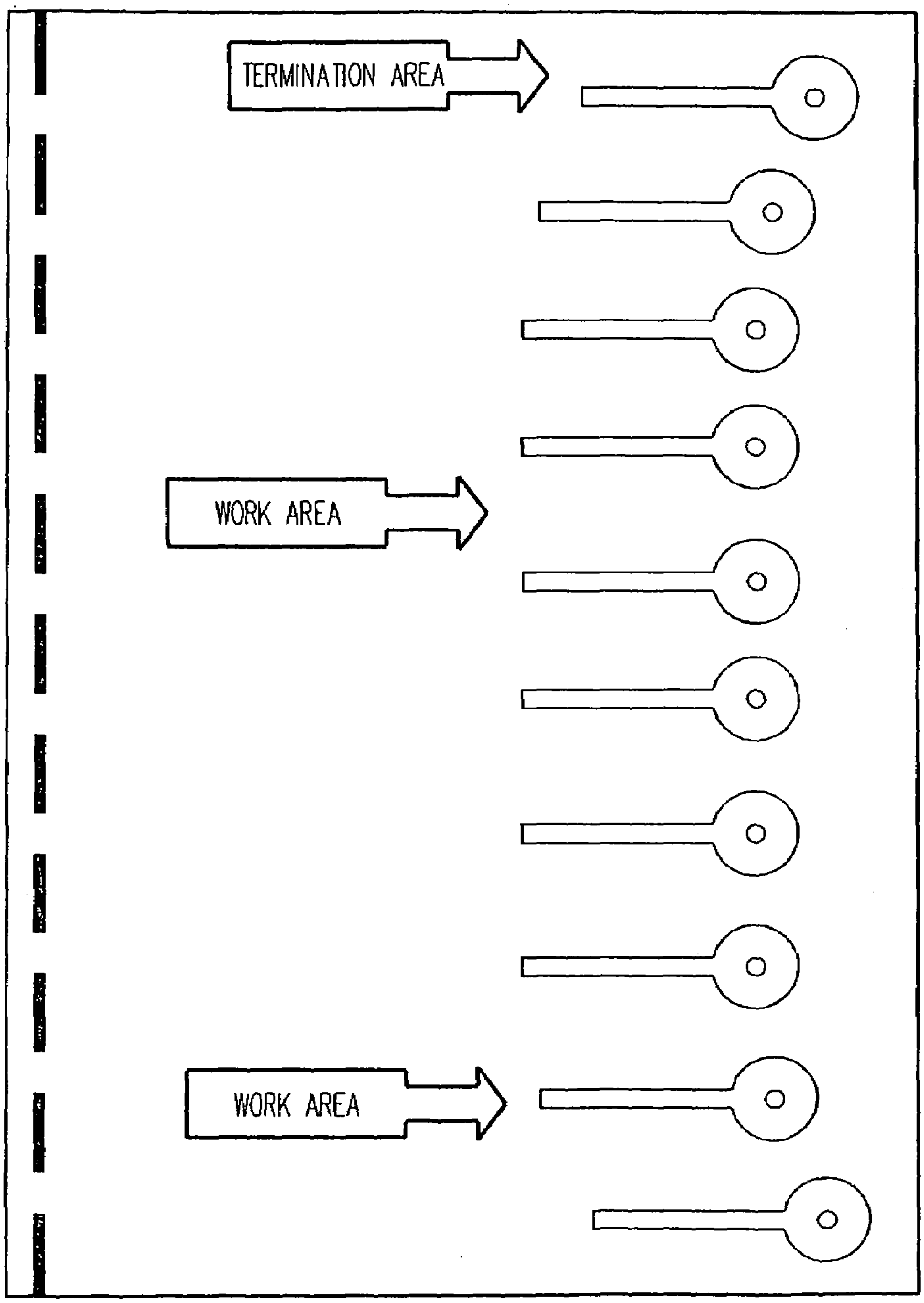
FIG. 2 is a deployment of the present invention in the preferred embodiment in the buffer area and work area.

FIG. 2 depicts the present invention, showing Warning Bumps 20 and 20*a*, being attached to a plurality of standard traffic cones 10*a* in which warning bump 20, as used in buffer zone 4, are deployed from traffic cones 10*a* and extend across roadway 1 well into the traffic lane through which the vehicles will traverse work zone 5 such that at least the right wheels of any vehicle, but preferably both right and left wheels, approaching work zone 5 in the lane through which traffic will travel through work zone 5 will contact Warning Bumps 20. Warning Bumps 21*a* are deployed in work zone 5 in the preferred embodiment, on each cone 10*a*, and extend a distance of approximately three feet into the roadway creating buffer zone 7*a*, wherein the vehicles encroaching into buffer zone 7*a* encounter a series of warning bumps 7*a* with their right wheels. In this preferred embodiment of the deployment of Warning Bumps 20 and 20*a*, the vehicle approaching work zone 5 through buffer zone 4 will encounter one or more Warning Bump 20's in buffer zone 4, thereby providing both audible and sensory stimulation to a driver to increase awareness of approaching work zone 5. If a vehicle traverses work zone 5 beyond the extension of warning bumps 20*a*, outside buffer 7*a*, safely away from the work area, there will be no further warnings generated for the driver or the workers to sense. If the vehicle traverses work zone 5 within buffer zone 7*a*, a series of warning bumps 20*a* will be encountered by the vehicle, generating a series of both audible and sensory warnings to the driver of the vehicle as well as an audible warning to the workers indicating that a vehicle is traversing the work area within buffer zone 7*a*. This situation permits the workers to be aware of the vehicle in buffer zone 7*a*, make observations of its operation and take appropriate action, if necessary, to protect themselves from injury. It is obvious that an almost infinite variety of configurations of warning bump 20 and 20*a* can be deployed to accomplish the purpose of providing warning to motorists and workers in traffic control zones. By way of example, Warning Bumps 20 could be deployed in transition area 3 in addition to buffer area 4 and work area 5, they can be deployed only in transition area 3 and work area 5, they can be deployed at close intervals in transition area 3, buffer area 4 and work area 5, they could be deployed in advance warning area 2, alone or in combination with deployment of Warning Bumps 20 or 20*a* in any of the other areas. It is also obvious that varying lengths of warning bump 20 can be used in these various areas including advance warning area 2, transition area 3, buffer area 4, and/or work area 5. For work in the center of roadways deployment of a mirror image of the deployment shown in FIG. 2 is appropriate. All configurations are considered to be within the scope of this present invention.

FIG. 3*a* depicts an embodiment of the present invention designed to work in combination with a standard traffic cone, which is comprised of base 22, which fits over the base of a standard traffic cone, the cone of which protrudes through opening 23. Warning Bump strip 21 is fixedly attached to base 22 and typically contains extension slot 24, which can be used to extend the length of Warning Bump strip 21. In the preferred embodiment, Warning Bump strip 21 is approximately 36 inches in length; shorter and longer lengths are contemplated by the present invention.

FIG. 3*b* illustrates an embodiment of the present invention in isometric view, used in cooperation with a standard warning barrel, which is comprised of Warning Bump 20, which is further comprised of base flange 22*a* in which there is opening 23*a*, which is slipped over a standard barrel. Warning Bump strip 21 is attached to flange 22*a* via warning bump strip extension 21*a* such that Warning Bump strip 21 lays flat on the pavement when warning bump 21 is deployed on a standard safety barrel. Warning Bump strip 21 at the end opposite to the point of attachment to strip extension 21*a* contains extension notch 24.

FIG. 3*c* is a cross section of Warning Bump strip 21 through section A-A in FIG. 3*a*. Flat surface 30 lays against a road surface when the Warning Bump is deployed. Sloped surfaces 31 which face upward are visible and provide a location for reflective strips 40 as shown in FIG. 11. In the preferred embodiment the width of Warning Bump Strip 21 is approximately five inches wide and approximately one inch high in a generally trapezoidal shape with a flat bottom and sloping sides.

FIG. 4*a* is a plan view of Warning Bump 20 showing Warning Bump strip 21, extension notch 24, base 22, and base perimeter 22*d*.

FIG. 4*b* depicts Warning Bump 20 in an elevation view showing Warning Bump strip 21 attached to base perimeter 22*d*, which is attached to base flange 22*c*, containing opening 23 such that a standard traffic cone can be inserted through opening 23 such that Warning Bump strip 21 lays flat on the pavement.

FIG. 5 is a plan view of warning bump extension 21*a*, which contains extension notch 24 and extension tab 25 such that extension tab 25 fits into extension notch 24 on warning bump 20 to extend the length of the Warning Bump extension to longer lengths. Extension notch 24 on warning bump extension 21*a* permits the adding of additional warning bump extension 21*a* components to produce an increased overall length as may be desired by the user. In the preferred embodiment the length of warning bump extension 21*a* is approximately three feet; however, shorter or longer lengths are contemplated by this invention.

FIG. 6 an elevation view showing the use of Warning Bump 20 with standard traffic cone 10, showing said cone, which rests directly on roadway 1, inserted through opening 23 and extension strip 21 and base perimeter 22*d* laying flat against the surface of roadway 1.

FIG. 7*a* shows an end view of warning bump extension 21*a* through section A-A in FIG. 5 illustrating extension notch 24, and FIG. 7*b* is an end view of the opposite end of warning bump extension 21*a* through section B-B in FIG. 5 illustrating extension tab 25. In the preferred embodiment extension tab 25 is "T" shaped and fits into extension notch 24 which is a comparable shaped cutout in the end of extension 24 such that when extension tab 25 is inserted into notch 24, whether on extension 21*a* or extension strip 21, forms a connection to provide for extending the length of Warning Bump 20. In the preferred embodiment extension tab 25 and extension notch 24 and molded into the components when they are manufactured. However, other means of connecting Warning Bump 20 to Warning Bump extension 21*a* or connecting additional Warning Bump extensions together as may be devised by those skilled in the art are contemplated to be within the scope of the present invention. In the preferred embodiment, warning bump extension 21*a* is substantially similar in cross section to Warning Bump strip 21 being a generally trapezoidal cross-section, approximately five inches in width and approximately one inch in height. For both Warning Bump strip 21 and Warning Bump extension 21*a* larger and smaller widths are contemplated by the present invention as well as lower or higher heights. The minimum height and width are determined by the generation of a minimum deflection of the wheels as they traverse the strip to transmit both an audible and sensory message to the operator of the vehicle. The range of heights for the preferred embodiment is ½ inch to 1¼ inch with an anticipated minimum height of a quarter of an inch and a minimum width of approximately two inches. As to the width, the maximum width, in combination with height, being limited by cost considerations for producing the invention and height limitations to avoid a jolt that might interfere with the operation of a vehicle passing over the Warning Bump. The maximum height contemplated is three inches. The preferred range of side slopes include angles from 15 degrees to 45 five degrees, however, no limitation is to be implied and other cross sectional shapes, including curvilinear shapes, which produce an audible and sensory warning are hereby contemplated. Examples of dimensions for other suitable cross sectional shapes are described in the above mentioned Department of Transportation Technical Advisory T 5040.35 setting forth heights and widths for rumble strips.

FIG. 8*a* shows the invention to be used in cooperation with a standard traffic barrel in plan view and FIG. 8*b* is an elevation view. In this embodiment base 22*a* is slipped over a standard barrel which fits inside opening 23*a*. Extension strip 21 is connected to base 22*a* by connector 26*a* to permit extension strip 21 to be deployed flat on a roadway.

FIG. 9 shows an isometric view of an alternate embodiment of warning bump 20 with a different base configuration for use in cooperation with a standard traffic cone.

FIG. 10*a* illustrates an embodiment of warning bump used in cooperation with Jersey barriers, namely trapezoidal concrete barriers, which is comprised of warning bump extension 21*a*, which contains extension slot 24 and anchor plate 30, which is fixedly attached to warning bump extension 21. FIG. 10*b* is an elevation view of the end of warning bump 20 used in combination with the Jersey barrier showing anchor plate 30 fixedly attached to warning bump extension 21 and further comprised of installation tab 31 which is fixedly attached to anchor plate 30. In the preferred embodiment, anchor plate 30 is forced under standard Jersey concrete barrier by hammering on installation tab 31 to drive anchor plate 30 under a concrete Jersey barrier to deploy Warning Bump 20 into the roadway with the bottom of Warning Bump extension 21 flat on the road surface. Here again, additional lengths of Warning Bump extension 21*a* can be attached to extension slot 24 to increase the length of the Warning Bump assembly. In the preferred embodiment, the length of warning bump extension 21*a* is approximately 36 inches and longer and shorter lengths are contemplated. In addition, other means to attach warning bump 20 to the New Jersey barrier are contemplated such as slipping anchor plate 30 through drain holes in the bottom of a standard New Jersey barrier or any other method for anchoring warning bump 20 to a Jersey barrier that might be contemplated by someone skilled in the art. In addition, alternate means of attachment are contemplated to use said Warning Bump with these and other types of traffic barriers including wood barriers as may envisioned by those skilled in the art.

FIG. 11 illustrates an embodiment of warning bump 20 which incorporates reflective strips 40, located along face 41 and or 42 of warning bump strip 21. Warning Bump extension 21*a* can also include an embodiment with such reflective strips. In addition, Warning Bump 20 and Warning Bump extension 21*a* can be made of material incorporating safety orange, yellow or green or other colors or reflective material that may be used to enhance visibility.

The present invention has been shown in various embodiments, however other improvements and modifications to this invention will become readily apparent to those skilled in the art. Therefore, the scope and intent of the present invention is to be limited only by the following claims.

We claim:

1. A traffic safety device comprising:

a) a horizontally extending base with an opening sized to permit said base to be fitted over or to be attached to a traffic safety device; and, b) a single horizontally extending warning bump strip fixedly attached to said base.

2. A traffic safety device as described in claim 1 which further contains means to removeably attach a warning bump extension, said warning bump extension placed at an end of said warning bump strip at an end opposite from the point of attachment of said warning bump strip to said base, and wherein only a single warning bump strip is attached directly to the base.

3. A traffic safety device as described in claim 2 which is further comprised of said traffic safety device in which a plurality of said warning bump extensions are removeably attached to each other to extend the length of said warning bump.

4. A traffic safety device comprising:

a) an anchor plate means to permit attachment to traffic barriers; and, b) a warning bump strip fixedly attached to said anchor plate.

5. A traffic safety device as described in claim 4 which further contains means to removeably attach a warning bump extension to the end of said warning bump strip at the end opposite from the point of attachment of said warning bump strip to said anchor plate.

6. A traffic safety device as described in claim 4 which is further comprised of said traffic safety device in which a plurality of said warning bump extensions are removeably attached to each other to extend the length of said warning bump.

7. A traffic safety device comprising:

a) a base with an opening sized to permit said base to be fitted over or attached to a traffic safety device;

b) a single rigid warning bump strip having a first end and a second end and fixedly attached to said base; and c) said traffic safety device being colored with a safety color to enhance visibility.

8. The traffic safety device as described in claim 7 further comprising a warning bump extension having a fist end;

means to removeably attach the warning bump extension to the second end of said warning bump strip at the end opposite from the point of attachment of said warning bump strip to said base.

9. The traffic safety device as described in claim 7 further comprising a further plurality of warning bump extensions, wherein the warning bump extensions are removeably attached to each other to extend the length of said warning bump strip.

10. The traffic safety device according to claim 7, wherein a single warning bump strip is fixedly attached to said base.

11. The traffic safety device according to claim 7, wherein the warning bump strip is about 5 inches wide, about one inch high and generally trapezoidal, with a flat bottom and sloping sides.

12. The traffic safety device according to claim 8 further comprising an extension notch furnished at the second end of the warning bump strip;

an extension tab furnished at the first end of the warning bump extension, wherein the extension tab is T-shaped and fits into the extension notch, wherein the extenion notch is a cutout in the end of the warning bump extension comparably and matchingly shaped to the T-shaped extension tab such that when the extension tab is inserted into the extension notch they form a connection to provide for extending the length of he warning bump strip. In the preferred embodiment extension tab 25 and extension notch 24 and molded into the components when they are manufactured; and wherein a minimum height of the warning bump strip is about a quarter of an inch and wherein a minimum height of the warning bump extenion is about a quarter of an inch.

13. The traffic safety device according to claim 12, wherein a height of the warning bump strip is from about ½ inch to 1¼ inch and wherein a height of the warning bump extenion is from about ½ inch to 1¼ inch, wherein a minimum width of the warning bump strip is about two inches and wherein a minimum width of the warning bump extenion is about two inches;

wherein a side slope angle of the warning bump strip is from about 15 degrees to 45 degrees and wherein a side slope angle of the warning bump extenion is from about 15 degrees to 45 degrees.

14. The traffic safety device according to claim 7, further comprising a connector, wherein the first endof the warning bump strip is connected to the base by the connector to permit warning bump strip to be deployed flat on a roadway.

15. A traffic safety device comprising:

a) an anchor plate means to permit attachment to traffic barriers;

b) a warning bump strip fixedly attached to said anchor plate; and c) said traffic safety device being colored with a safety color to enhance visibility.

16. A traffic safety device as described in claim 15 which further contains means to removeably attach a warning bump extension to the end of said warning bump strip at the end opposite from the point of attachment of said warning bump strip to said anchor plate.

17. A traffic safety device as described in claim 16 which is further comprised of said traffic safety device in which a plurality of said warning bump extensions are removeably attached to each other to extend the length of said warning bump.

18. A traffic safety device comprising:

a) a base with an opening sized to permit said base to be fitted over or attached to a traffic safety device;

b) a warning bump strip fixedly attached to said base; and c) said warning bump strip containing reflective strips or coatings an one or more upper surfaces to enhance visibility.

19. A traffic safety device as described in claim 18 which further contains means to removeably attach a warning bump extension to the end of said warning bump strip at the end opposite from the point of attachment of said warning bump strip to said base.

20. A traffic safety device as described in claim 19 which is further comprised of said traffic safety device in which a plurality of said warning bump extensions are removeably attached to each other to extend the length of said warning bump.

21. A traffic safety device comprising:

a) an anchor plate means to permit attachment to traffic barriers;

b) a warning bump strip fixedly attached to said anchor plate; and c) said warning bump strip containing reflective strips or coatings an one or more upper surfaces to enhance visibility.

* * * * *